United States Patent [19]
Wilhelm

[11] 4,039,038
[45] Aug. 2, 1977

[54] VEHICLE TRANSFER CASE STABILIZER BAR

[75] Inventor: Bartel Wilhelm, Carson City, Nev.

[73] Assignee: The Raymond Lee Organization, Inc., New York, N.Y.; a part interest

[21] Appl. No.: 639,210

[22] Filed: Dec. 9, 1975

[51] Int. Cl.² .......................................... B60K 17/34
[52] U.S. Cl. .................................................. 180/70 R
[58] Field of Search ...................... 180/64 R, 49, 70 R

[56] References Cited
U.S. PATENT DOCUMENTS

| | | | |
|---|---|---|---|
| 3,033,302 | 5/1962 | Ball | 180/64 R |
| 3,048,233 | 8/1962 | Crain | 180/49 |
| 3,139,152 | 6/1964 | Bajer | 180/64 R |
| 3,150,737 | 9/1964 | Kozicki | 180/70 R |
| 3,402,782 | 9/1968 | Ljungstrom | 180/64 R |

Primary Examiner—Joseph F. Peters, Jr.
Assistant Examiner—R. Schrecengost
Attorney, Agent, or Firm—Howard I. Podell

[57] ABSTRACT

A stabilizer bar fastened to the four wheel drive transfer case and to an adjoining frame cross member to correct for vibration and tilt of the transfer case when the attached vehicle is in the four wheel drive mode. The transfer case is mounted below a transverse frame cross member, and the stabilizer bar is threaded at each end to a set of nuts surrounding rubber washers, with one end of the stabilizer bar fitted to an adjacent transverse cross member and the other end fastened through a hole in the wall of the transfer case to the case wall. The threaded ends of the stabilizer bar permit adjustment of the length of the stabilizer bar.

3 Claims, 2 Drawing Figures

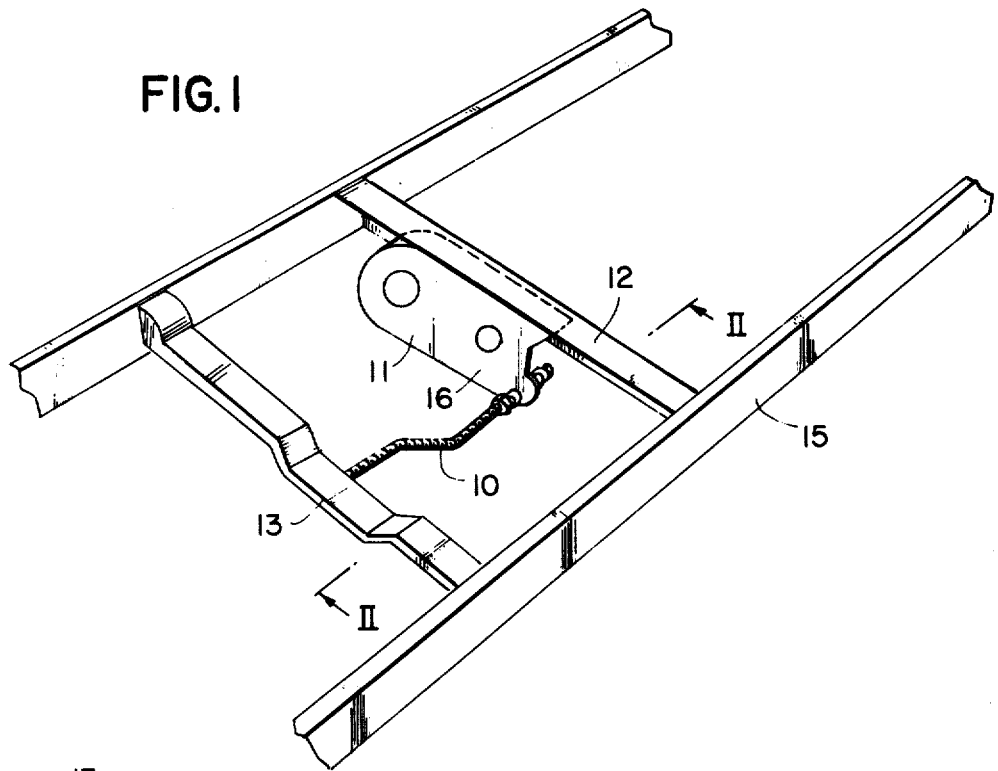
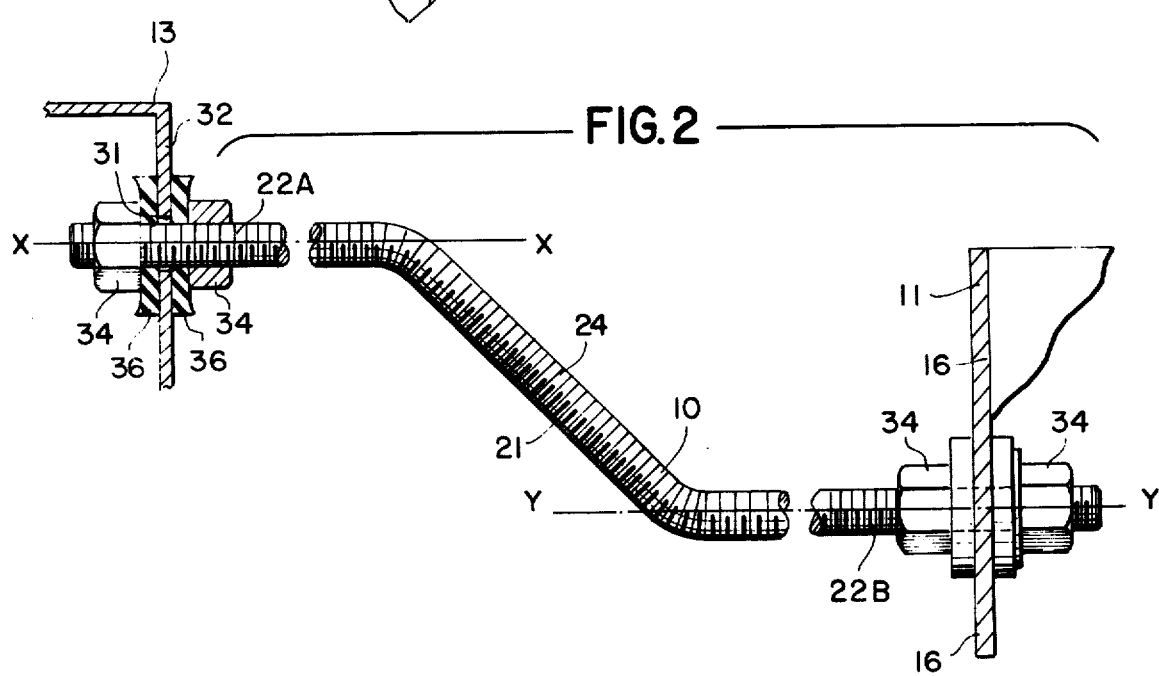

VEHICLE TRANSFER CASE STABILIZER BAR

SUMMARY OF THE INVENTION

My invention is a stabilizer bar fastened to the four wheel drive transfer case and to an adjoining frame cross member to correct for vibration and tilt of the transfer case when the attached vehicle is in the four wheel drive mode. The transfer case is mounted below a transverse frame cross member, and the stabilizer bar is threaded at each end to a set of nuts surrounding rubber washers, with one end of the stabilizer bar fitted to an adjacent transverse cross member and the other end fastened through a hole in the wall of the transfer case to the case wall. The threaded ends of the stabilizer bar permit adjustment of the length of the stabilizer bar.

The invention has been of particular value in eliminating vibration of the attached vehicle in the four wheel drive mode when installed on Chrysler four wheel drive vehicles.

BRIEF DESCRIPTION OF THE DRAWINGS

The objects and features of the invention may be understood with reference to the following detailed description of an illustrative embodiment of the invention, taken together with the accompanying drawings in which:

FIG. 1 is a perspective view of the invention installed; and

FIG. 2 is a side view taken along line II—II of FIG. 1 of the installed invention.

DESCRIPTION OF THE PREFERRED EMBODIMENT

Turning now descriptively to the drawings, in which similar reference characters denote similar elements throughout the several views, FIGS. 1-2 illustrate the invention 10 employed to provide longitudinal support to the wall 16 of the four wheel drive transfer case 11, which case is conventionally fastened to a transverse member 12 of the frame 15 of a vehicle.

The invention 10 is in the form of a rod 21 which may be threaded at each end segment 22 or, as shown, may be threaded throughout its length. Rod 21 is shaped to form two end segments 22A and 22B, with the axis X—X of end segment 22A parallel to axis Y—Y of end segment 22B, and both axes offset from each other, preferably by a distance of two and one-half inches. End segments 22A and 22B are each fastened to intermediate segment 24 which is oriented at an angle to the axes of end segments 22A and 22B.

End segment 22A is fastened through a hole 31 in a vertical flange 32 of a transverse frame member 13 lying adjacent to the transverse frame member 12 from which the transfer case 11 is hung. End segment 22B is fastened through a hole in the lower section of the wall 16 of the transfer case 11.

Each end segment is fastened in place by means of a pair of female threaded nuts 34 that each bear against a rubber washer 36 with the rubber washers 36 tightened by the nuts 34 against the flange 32 or case wall 16.

The male threaded section of end segments 22A and 22B and the offset axes of each end segments permit adjustment of rod 21, prior to tightening nuts 34 to provide for adjustment of the case wall 16 along both the transverse and longitudinal axes of frame 15, with regard to the location of the mounting hole 31 in transverse member 12, so as to eliminate undesirable vibration of the transfer case 11.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A support rod for reinforcing the support of a four wheel drive transfer case to an attached vehicle frame, such that the transfer case is rigidly joined by the support rod to a transverse frame member adjacent to the transverse frame member on which the transfer case is mounted, said rod shaped to provide adjustment of the distance between the opposed mounting points of the installed rod between the transfer case and the vehicle frame, along three mutually perpendicular axes, comprising a rod formed with an intermediate segment bent at an angle to each of two opposed end segments, with both end segments oriented about axes mutually parallel to each other and with said axes offset from each other, each of said end segments formed with a male threaded section extending to the end of the end segment, together with a pair of nuts and a pair of rubber washers associated with each end segment adaptable for fastening a first end segment through a hole in a flange of a vehicle transverse frame member in fixed relation to the said frame member, and the second end segment through a hole in the wall of a four wheel drive transfer case in fixed relation to the transfer case wall.

2. The method of stabilizing a four wheel transfer case attached to a transverse frame member of a vehicle so as to minimize vibration, using the support rod described in claim 1 comprising the steps of:

a. drilling a hole in the flange of a transverse frame member of the vehicle, which frame member is adjacent to the frame member to which the transfer case is mounted, b. drilling a hole in the wall of the transfer case;

c. bolting a first end segment of the rod to said flange by placing a nut and a rubber washer on the rod on each side of the flange so that a rubber washer lies between each nut and the flange, d. bolting the second end segment in similar fashion to the wall of the transfer case, and e. adjusting, by loosening and retightening of the nuts the lateral offset and longitudinal spacing between the two mounting holes so as to support the transfer case wall at a point of minimum vibration of the transfer case.

3. The combination as recited in claim 1 installed in a vehicle, with one end section of the rod fastened to a vehicle frame and the opposed end section fastened to the four wheel drive transfer case.

* * * * *